(12) United States Patent
Bustamante Laparra

(10) Patent No.: US 11,121,427 B1
(45) Date of Patent: Sep. 14, 2021

(54) STABILIZING ELECTRIC BATTERY SYSTEM FOR VEHICLES

(71) Applicant: Julian Enrique Bustamante Laparra, Guatemala (GT)

(72) Inventor: Julian Enrique Bustamante Laparra, Guatemala (GT)

(*) Notice: Subject to any disclaimer, the term of this patent is extended or adjusted under 35 U.S.C. 154(b) by 16 days.

(21) Appl. No.: 16/257,131

(22) Filed: Jan. 25, 2019

(51) Int. Cl.
*H01M 50/20* (2021.01)
*H02J 7/00* (2006.01)
*B60L 50/64* (2019.01)

(52) U.S. Cl.
CPC ............ *H01M 50/20* (2021.01); *B60L 50/64* (2019.02); *H02J 7/0014* (2013.01)

(58) Field of Classification Search
CPC ...... H01M 2/1083; H01M 2/1077; B60K 1/04
See application file for complete search history.

(56) References Cited

U.S. PATENT DOCUMENTS

| | | |
|---|---|---|
| 3,930,552 A | 1/1976 | Kunkle et al. |
| 4,450,400 A * | 5/1984 | Gwyn .................. B60K 1/04 320/109 |
| 4,609,313 A * | 9/1986 | Oshino .................. B60R 16/02 16/348 |
| 5,373,910 A * | 12/1994 | Nixon .................. B60K 1/04 180/65.1 |
| 6,109,380 A | 8/2000 | Veenstra |
| 6,220,380 B1 | 4/2001 | Mita et al. |
| 6,260,645 B1 | 7/2001 | Pawlowski et al. |
| 7,913,788 B1 | 3/2011 | Bryer et al. |
| 8,256,553 B2 * | 9/2012 | De Paschoal ............ B60G 3/20 180/65.1 |
| 8,267,210 B2 | 9/2012 | Jones et al. |
| 8,376,076 B2 * | 2/2013 | Kataoka .................. B61C 17/00 104/34 |
| 8,852,794 B2 * | 10/2014 | Laitinen ............... H01M 2/1083 429/163 |
| 9,038,757 B2 | 5/2015 | Ogushi et al. |
| 9,145,045 B2 * | 9/2015 | Chang .................. H01M 2/1077 |
| 9,216,638 B2 | 12/2015 | Katayama et al. |
| 9,394,004 B2 | 7/2016 | Gotou et al. |
| 9,469,182 B2 | 10/2016 | Merkel |
| 9,511,657 B2 | 12/2016 | Engler et al. |
| 9,755,202 B2 | 9/2017 | Sham |
| 9,758,030 B2 | 9/2017 | Newman |
| 9,963,028 B1 | 5/2018 | Pachore |
| 9,991,484 B2 | 6/2018 | Sham |

(Continued)

FOREIGN PATENT DOCUMENTS

JP H09300982 A 5/1996

*Primary Examiner* — Hau V Phan
(74) *Attorney, Agent, or Firm* — Albert Bordas, P.A.

(57) ABSTRACT

A stabilizing electric battery system for vehicles that has a battery assembly and a rail assembly fixedly mounted onto a section of a chassis of a vehicle. The battery assembly has a battery and a housing. The battery assembly is mounted onto the rail assembly and moves laterally when the vehicle turns to increase stability of the vehicle in the turns. The rail assembly has a base and first and second rails. The first and second rails are mounted onto the base. Each of the first and second rails has respective linear ball bearing assembly. While the vehicle turns, the battery assembly slides on linear ball bearing assemblies from right to left and from left to right, in a same direction as the vehicle.

11 Claims, 4 Drawing Sheets

(56) References Cited

U.S. PATENT DOCUMENTS

| | | |
|---|---|---|
| 10,017,037 B2 | 7/2018 | Newman et al. |
| 2004/0232672 A1 | 11/2004 | Masashi et al. |
| 2012/0321927 A1 | 12/2012 | Loo et al. |
| 2015/0255764 A1 | 9/2015 | Loo et al. |
| 2017/0029034 A1* | 2/2017 | Faruque .................. B60K 1/04 |
| 2017/0364075 A1* | 12/2017 | Hirata .................... B60K 11/00 |
| 2018/0130983 A1* | 5/2018 | Tessier .................... B60K 1/04 |

\* cited by examiner

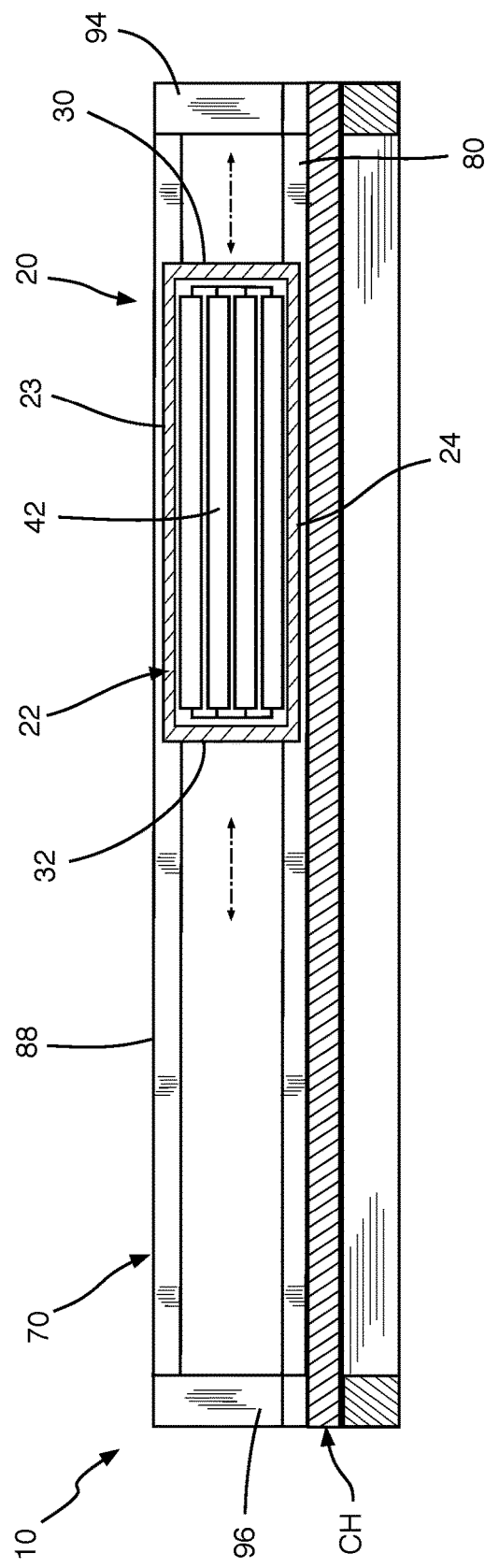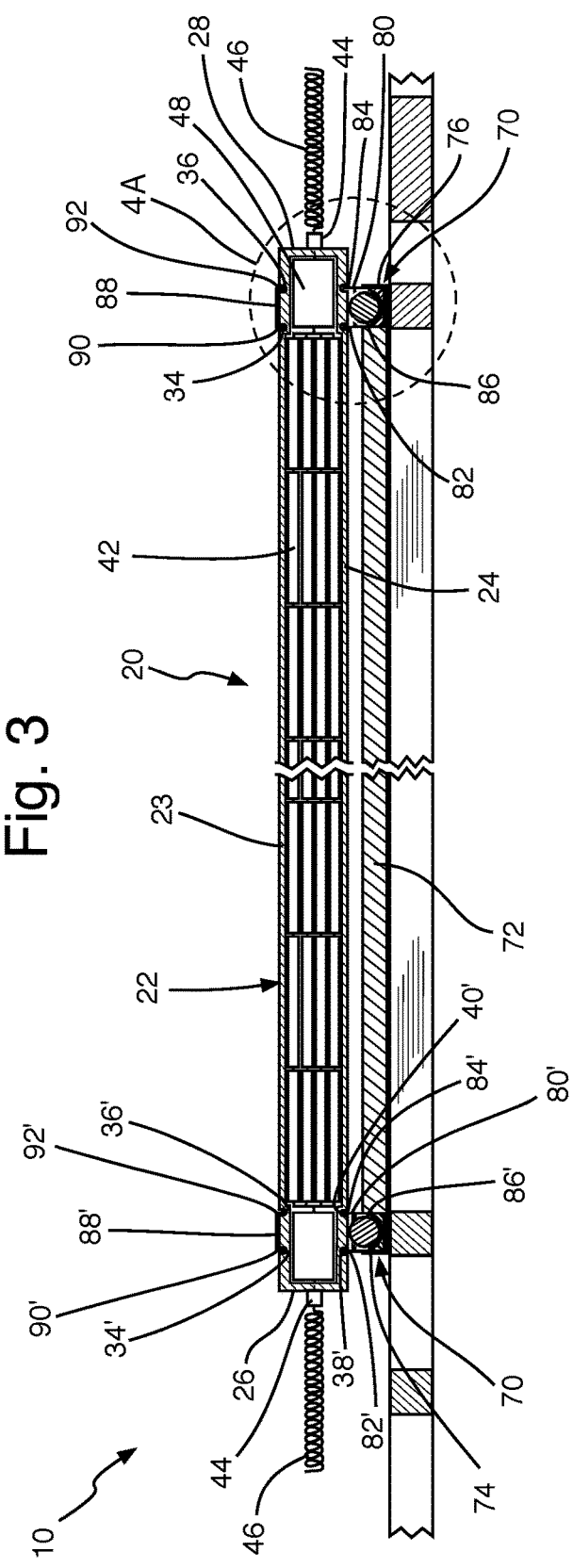

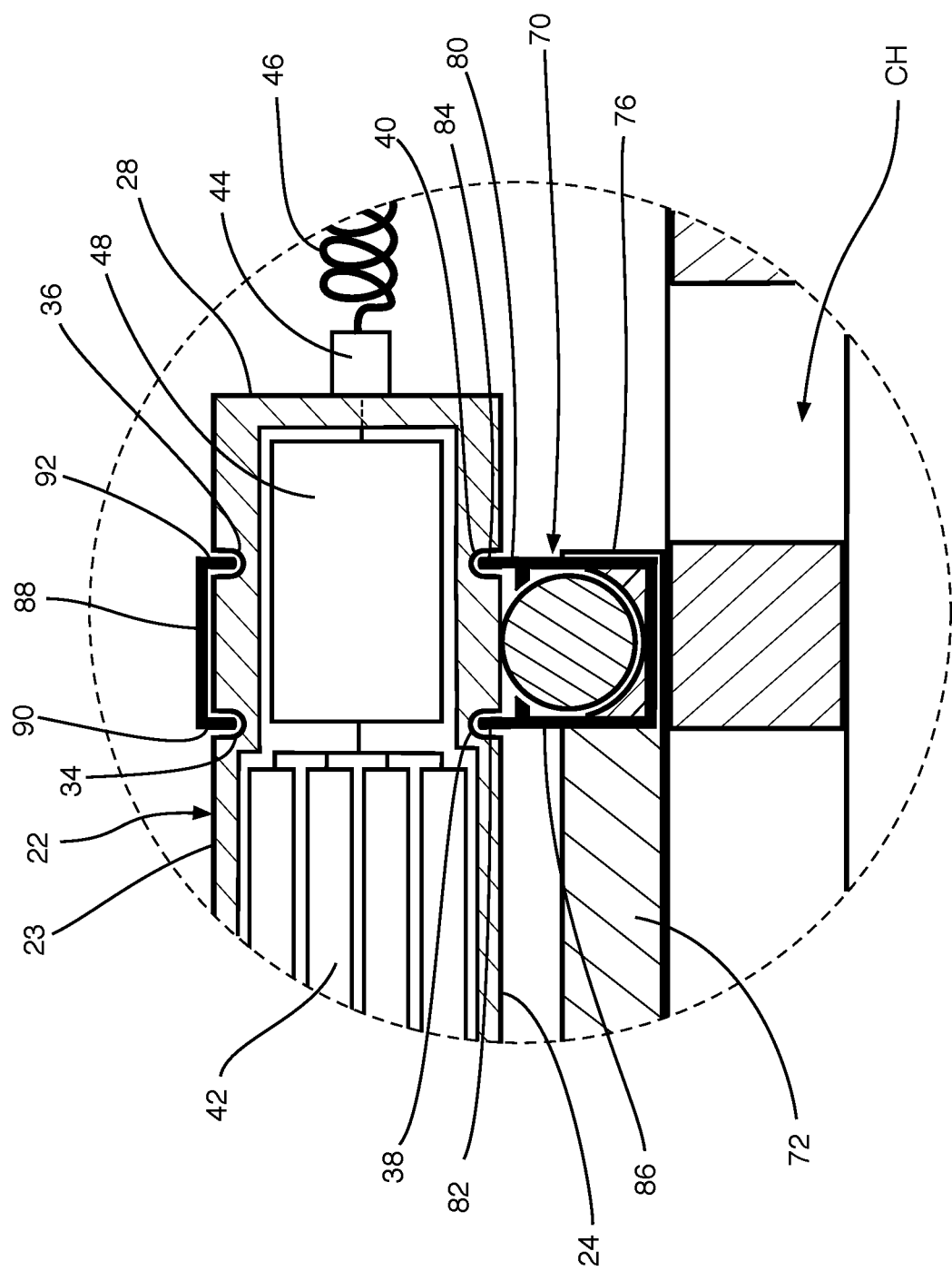

STABILIZING ELECTRIC BATTERY SYSTEM FOR VEHICLES

BACKGROUND OF THE INVENTION

1. Field of the Invention

The present invention relates to battery systems for electric vehicles, and more particularly, to stabilizing electric battery systems for use in electric vehicles.

2. Description of the Related Art

Applicant believes that one of the closest references corresponds to U.S. Pat. No. 3,930,552 issued to Kunkle, et al. on Jan. 6, 1976 for Motor vehicle battery holder. However, it differs from the present invention because Kunkle, et al. teach a motor vehicle that has an enclosed battery storage compartment with a door separating the compartment from an adjacent support surface that has been roughened to reduce slippage of persons stepping thereon. A battery holder has a mounting base in the compartment and a battery cell support tray mounted on wheels for rolling between a position on top of the mounting base, where the battery cells are housed, and a position on the surface, where the battery cells are inspected and serviced. Mounted to the tray is a handle having a horizontally extending grip portion for grasping to move the handle or tray and a vertical projecting lock portion for engaging a keeper, mounted on the mounting base, to lock the tray in a stationary position. When the handle is in a tray locking position, the grip portion of the handle extends adjacent the tray and the compartment door can be closed, retaining the handle in its locked position. When the door is opened and the handle unlocked, the grip portion of the handle extends outwardly from the tray for moving the tray. Stops limit the outward movement of the tray from the compartment onto the adjacent support surface and guides are provided to restrain tray movement laterally of the normal direction of movement between the compartment and the support surface. Wheel retainers are provided to limit upward movement of the tray above the base.

Applicant believes that another reference corresponds to U.S. Pat. No. 6,109,380 issued to Michael Jon Veenstra on Aug. 29, 2000 for Electric vehicle vertical wall construction battery tray. However, it differs from the present invention because Veenstra teaches an electric vehicle battery tray includes a base having an inner surface and an outer surface, a front and back wall having outer and inner surfaces adapted to overlay the base outer surface and to create substantially planar, vertical front and back wall inner surfaces thereby, and a left and right side wall having outer and inner surfaces adapted to longitudinally overlay the base outer surface and to create substantially planar, vertical left and right side wall inner surfaces thereby.

Applicant believes that another reference corresponds to U.S. Pat. No. 6,220,380 B1 issued to Mita, et al. on Apr. 24, 2001 for Electric vehicle with battery box arrangement. However, it differs from the present invention because Mita, et al. teach a battery box detachably supported below a floor panel at a central portion of an electric vehicle. Batteries are mounted in a rear portion of the battery box, and a control unit and a PDU are mounted in a front portion of the battery box. The positions of the control unit and the PDU are lowered, which can contribute to the lowering of the center of gravity of a vehicle, and power lines extending from the batteries via the control unit and the PDU to a road wheel driving motor can be disposed at shortest distances, whereby the lengths of the power lines can be suppressed to the minimum.

Applicant believes that another reference corresponds to U.S. Pat. No. 6,260,645 B1 issued to Pawlowski, et al. on Jul. 17, 2001 for Electric vehicle with a movable battery tray mounted between frame rails. However, it differs from the present invention because Pawlowski, et al. teach a land vehicle having wholly independent multiple suspension units with integral propulsion systems. The independent suspension unit includes a self-contained return spring, dampener, motor-wheel drive mechanism with attached brake-mechanism, and rotary, and linear regenerative devices. The independent suspension system does not require or use an axle. The axleless suspension is mounted to a frame rail of the vehicle, which may be formed generally straight, as there is no axle to accommodate. The vehicle frame includes side rails between which a compartment, such as a battery compartment, may be placed. The frame rails include rollers, which facilitate insertion and removal of the compartment between the frame rails. The frame rails also may be formed to enable the passage of conduits, such as fluid transfer or temperature control lines, for routing fluids between the battery compartment and a thermal management system.

Applicant believes that another reference corresponds to U.S. Pat. No. 7,913,788 B1 issued to Bryer, et al. on Mar. 29, 2011 for Integrated energy storage and rear suspension assembly. However, it differs from the present invention because Bryer, et al. teach an integrated aerodynamic energy storage and rear suspension assembly that include a rear fuel tank/suspension module, a battery support assembly and a structural joining plate. The rear fuel tank/suspension module includes a rear sandwich panel, a fuel tank assembly mounted on the rear sandwich panel, with the rear fuel tank/suspension module sliding into a rear body cavity. The battery support assembly includes a propulsion battery mounted on a front sandwich plate with the front sandwich plate having an upper face sheet adjacent to the propulsion battery, a lower face sheet spaced from the upper face sheet and a core connecting the upper face sheet to the lower face sheet, and with the lower face sheet having a smooth lower surface.

Applicant believes that another reference corresponds to U.S. Pat. No. 8,267,210 B2 issued to Jones, et al. on Sep. 18, 2012 for Power supply assembly for motorized vehicles. However, it differs from the present invention because Jones, et al. teach a vehicle having a plurality of wheels and elements, to drive at least one wheel to propel the vehicle with a frame and a power supply assembly for delivering power to the drive elements. The power supply assembly includes a battery and a housing structure surrounding the battery. The power supply assembly is removably supported on the vehicle frame. A latching mechanism is provided having a pivoting actuator. The actuator moves between a locking position and a release position. The actuator movement displacing a pin disposed in combination with the housing between a locking position, wherein the pin fixedly engages the power supply assembly to the frame, and a release position, wherein the pin disengages and permits the power supply assembly to be removed from the frame.

Applicant believes that another reference corresponds to U.S. Pat. No. 9,038,757 B2 issued to Ogushi, et al. on May 26, 2015 for Vehicle battery mounting structure. However, it differs from the present invention because Ogushi, et al. teach a vehicle battery mounting structure having a service hole cover that closes a service hole. The service hole cover includes a rear cover that covers a rear end side of the service hole in a vehicle longitudinal direction and a front cover that covers a front end side of the service hole in the vehicle longitudinal direction. The service hole cover is split into the rear cover and the front cover in the vehicle longitudinal direction. The front cover is detachably attached to a floor upper reinforcement provided on a floor panel by bolts.

Applicant believes that another reference corresponds to U.S. Pat. No. 9,216,638 B2 issued to Katayama, et al. on Dec. 22, 2015 for Structure for mounting battery pack on vehicle. However, it differs from the present invention because Katayama, et al. teach a structure for mounting a battery pack on a vehicle. Even if a battery case housing a plurality of batteries is disposed beneath a floor panel, due to an internal cable within the battery case being disposed above the batteries, it is possible to prevent the internal cable from becoming wet. Furthermore, if the internal cable disposed above the batteries were connected to an external cable via a high voltage connector without changing the height, the height of the floor panel would increase to thus constrain the vehicle compartment space, but since the high voltage connector is disposed at a position that is lower than the upper end of the battery, it is possible to decrease the height of the floor panel by disposing the external cable at a low position, thereby ensuring the vehicle compartment space.

Applicant believes that another reference corresponds to U.S. Pat. No. 9,394,004 B2 issued to Gotou, et al. on Jul. 19, 2016 for Electric automobile. However, it differs from the present invention because Gotou, et al. teach an electric automobile that has a motor room separated from the cabin and partitioned at the front of the vehicle body and housing a driving motor and a power control unit that drives/controls the driving motor, a pair of side frames extending in the front-back direction of the vehicle body at both sides of the vehicle body; and a unit support frame that encloses the power control unit on four sides and supports the power control unit. The unit frame is suspended from the pair of side frames and is fastened to the pair of side frames. The power control unit is supported by the unit support frame at least the sides excluding that in the backwards direction of vehicle body of the four sides of the unit support frame.

Applicant believes that another reference corresponds to U.S. Pat. No. 9,469,182 B2 issued to Timo Fabian Merkel on Oct. 18, 2016 for Mounting frame for an electrically driven motor vehicle. However, it differs from the present invention because Merkel teaches a mounting frame for an electrically driven motor vehicle that has two frame beams oriented in a longitudinal direction of the motor vehicle. An electric drive unit for driving the motor vehicle is mounted on the frame beams, and has an electrical component formed separately from the electric drive unit. The electrical component is accommodated in a flexurally stiff housing that is mounted on the mounting frame. The frame beams form a frame arrangement, which is open outwardly in the longitudinal direction, and the housing of the electrical component is mechanically fixedly connected to the two frame beams to form a closed frame section together with the frame beams.

Applicant believes that another reference corresponds to U.S. Pat. No. 9,511,657 B2 issued to Engler, et al. on Dec. 6, 2016 for Replaceable battery module for an electric vehicle. However, it differs from the present invention because Engler, et al. teach a replaceable battery module for an electrically driven vehicle, with at least one bracket that can be detachably arranged on a bearing structure of the motor vehicle, and carries at least one battery unit.

Applicant believes that another reference corresponds to U.S. Pat. No. 9,755,202 B2 issued to Wellen Sham on Sep. 5, 2017 for Battery pack of electric vehicle, electric vehicle chassis and method for replacing battery modules. However, it differs from the present invention because Sham teaches systems and methods for configuring battery packs in electric vehicles. A battery pack may include a plurality of battery modules, a support part, and at least one opening provided on the support part. The support part may be provided with a bottom for supporting the plurality of battery modules, sides, a top, and an accommodation space formed by the bottom, the sides, and the top for accommodating the plurality of battery modules. The opening provided on the bottom of the support part may enable the plurality of battery modules to be passed through the at least one opening and be detachably mounted to the bottom of the support part so as to be supported by the bottom.

Applicant believes that another reference corresponds to U.S. Pat. No. 9,758,030 B2 issued to Austin Lawrence Newman on Sep. 12, 2017 for Replaceable battery assembly having a latching mechanism. However, it differs from the present invention because Newman teaches a removable battery assembly that includes a battery pack having a plurality of electrical storage devices; and a latching mechanism for securing the battery pack to a frame structure of a vehicle. The latching mechanism has a first latch part configured to be attached to the frame structure and a second latch part on the battery pack. The second latch part is configured to receive at least a portion of the first latch part. The latching mechanism also has a biasing seal configured to bias the latching mechanism into a latched position.

Applicant believes that another reference corresponds to U.S. Pat. No. 9,963,028 B2 issued to Vijay Pachore on May 8, 2018 for Battery support structure for electrified vehicle. However, it differs from the present invention because Pachore teaches an electrified vehicle that includes a body structure defining a support surface and a crush space adjacent the support surface. The electrified vehicle further includes a traction battery for providing power to a powertrain. The electrified vehicle further includes a battery support structure having at least one hinge mechanism secured to the traction battery and to the support surface to permit rotational movement of the traction battery relative to the support surface. The battery support structure further includes a guide rail secured to the support surface. The battery support structure further includes a slide rail disposed in engagement with the guide rail and slidable relative to the guide rail. The battery support structure further includes at least one linkage rotatably secured at a first end to the slide rail and rotatably secured at a second end to the traction battery.

Applicant believes that another reference corresponds to U.S. Pat. No. 9,991,484 B2 issued to Wellen Sham on Jun. 5, 2018 for Battery pack of electric vehicle, electric vehicle chassis and method for replacing battery modules. However, it differs from the present invention because Sham teaches systems and methods for configuring battery packs in electric vehicles. A battery pack may include a plurality of battery modules, a support part, and at least one opening provided on the support part. The support part may be provided with a bottom for supporting the plurality of battery modules, sides, a top, and an accommodation space formed by the bottom, the sides, and the top for accommodating the plurality of battery modules. The opening provided on the bottom of the support part may enable the plurality of battery modules to be passed through the at least one opening and be detachably mounted to the bottom of the support part so as to be supported by the bottom.

Applicant believes that another reference corresponds to U.S. Pat. No. 10,017,037 B2 issued to Newman, et al. on Jul. 10, 2018 for Vehicle having a battery pack directly attached to the cross rails of a frame structure. However, it differs from the present invention because Newman, et al. teach a vehicle that has a body forming a passenger compartment. The vehicle also has a chassis supporting the body. The chassis includes a frame structure having a pair of side rails connected by a plurality of rigid cross rails and defining a plurality of bays between the cross rails. The vehicle additionally has a battery pack including a plurality of electrical storage devices stored in a battery housing. The battery housing defines a plurality of channels. The vehicle further includes a fastening mechanism attaching the battery housing directly to the plurality of cross rails with at least a portion of the battery housing in the plurality of bays and the plurality of cross rails in the plurality of channels.

Applicant believes that another reference corresponds to U.S. Patent Application Publication No. 2004/0232672 A1, published on Nov. 25, 2004 to Masashi et al. for High-voltage electrical equipment case arranging structure. However, it differs from the present invention because Masashi et al. teach a high-voltage electrical equipment case arranged between a driver's seat and a front passenger's seat which are placed in parallel in a transverse direction, whereby in the event that the battery which is a heavy article is accommodated in this high-voltage electrical equipment case, a necessity is obviated of disposing the battery underneath a rear seat. Moreover, the high-voltage electrical equipment case can be disposed near an air conditioner that is installed in a front part of a vehicle.

Applicant believes that another reference corresponds to U.S. Patent Application Publication No. 2012/0321927 A1, published on Dec. 20, 2012 to Loo et al. for Battery case for vehicle. However, it differs from the present invention because Loo et al. teach a battery case for a vehicle that includes a tray member made of resin and configured to hold a battery, one or more beam members arranged so as to extend in at least one of width and longitudinal directions of the tray member, the one or more beam members supporting the tray member and having a recess formed therein, and a bottom wall interposed between the tray member and the one or more beam members and closing an aperture plane of the recess of the one or more beam members to form a closed cross-section, the bottom wall being constituted by a continuous metal plate underlying a bottom plate of the tray member.

Applicant believes that another reference corresponds to U.S. Patent Application Publication No. 2015/0255764 A1, published on Sep. 10, 2015 to Loo, et al. for Battery pack for electric vehicle. However, it differs from the present invention because Loo, et al. teach a battery pack for an electric vehicle capable of enhancing the strength of the entire side wall of a tray, a battery pack for an electric vehicle includes: a tray; and at least one outer frame disposed on an outer side of a side wall surface of the tray, the outer frame extending along the side wall surface and being welded thereto so as to cover the side wall surface. The at least one outer frame includes: a first protruding section welded to an outer bottom surface of the tray; a second protruding section positioned above the first protruding section and formed to protrude outwardly from the tray; an outer section connecting the first protruding section and the second protruding section at a position outwardly spaced from the side wall surface of the tray; and an inner section extending from the second protruding section toward the first protruding section and being welded to the outer surface of the tray. The first protruding section, the second protruding section and the inner section form a part of a closed cross section, and the outer section includes an aperture through which a welding gun for welding the side wall surface of the tray and the inner section is insertable.

Applicant believes that another reference corresponds to Japanese Patent No. H09300982 A issued to Katsuji Nishikawa on May 9, 1996 for Battery frame structure of electric vehicle. However, it differs from the present invention because Nishikawa teaches a junction box that is stored and fixed in the closed cross section of a longitudinal direction frame of a battery frame. The junction box has a relay function and an electricity shutting off function, and independently divided into positive and negative electrode side junction boxes, and electrically connected to a controller in a motor room through a high electricity harness by drawing out the high electricity harness by being passed through a lid.

Other patents describing the closest subject matter provide for a number of more or less complicated features that fail to solve the problem in an efficient and economical way. None of these patents suggest the novel features of the present invention.

SUMMARY OF THE INVENTION

The present invention is a stabilizing electric battery system for vehicles comprising a battery assembly and a rail assembly. The battery assembly has a battery and a housing. The rail assembly is fixedly mounted onto a section of a chassis of a vehicle. The battery assembly is mounted onto the rail assembly and moves laterally when the vehicle turns to increase stability of the vehicle in the turns.

The battery assembly comprises a housing top wall, a housing bottom wall, a housing front wall, a housing rear wall, and first and second housing lateral walls. The housing top wall comprises first and second top channels, and the housing bottom wall comprises first and second bottom channels.

The battery comprises battery ends, connectors, and wires. The connectors and the wires extend from respective housing front wall and housing rear wall.

The rail assembly comprises a base and first and second rails. The first and second rails are mounted onto the base. The base comprises a base front end and a base rear end. Each of the first and second rails comprises respective first and second rail bottom walls and a linear ball bearing assembly.

The rail assembly further comprises first and second rail tops. Each of the first and second rail tops comprises respective first and second rail top walls.

The rail assembly further comprises stoppers. The stoppers are positioned at ends of respective first and second rails. Respective first and second top channels receive respective first and second rail top walls. First and second bottom channels receive respective first and second rail bottom walls.

While the vehicle turns, the battery assembly slides on the respective linear ball bearing assemblies from right to left and from left to right, in a same direction as the vehicle, while the stoppers limit movement of the battery assembly at the first or second housing lateral walls.

The vehicle is an electric vehicle. The battery assembly defines a first predetermined area and a central section of the chassis defines a second predetermined area, whereby the first predetermined area is approximately half of the second predetermined area.

It is therefore one of the main objects of the present invention to provide a stabilizing electric battery system for vehicles.

It is another object of this invention to provide a stabilizing electric battery system for vehicles that allows that the battery occupies only a half of the bottom space of a chassis.

It is another object of this invention to provide a stabilizing electric battery system for vehicles in which the battery is movable.

It is another object of this invention to provide a stabilizing electric battery system for vehicles, in which the battery is able to displace from right to left and viceversa inside the battery housing to the same side of the turn.

It is another object of this invention to provide a stabilizing electric battery system for vehicles that improve vehicle stability in curves.

It is another object of this invention to provide a stabilizing electric battery system for vehicles, using the own weight of the electric battery, in which the battery is able to displace from right to left and vice versa when the vehicle turns.

It is another object of this invention to provide a stabilizing electric battery system for vehicles that is volumetrically efficient.

It is another object of this invention to provide a stabilizing electric battery system for vehicles that can be readily assembled and disassembled without the need of any special tools.

It is another object of this invention to provide a stabilizing electric battery system for vehicles, which is of a durable and reliable construction.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3 is a cut view taken along lines 3-3 from FIG. 1.

FIG. 4 is a cut view taken along lines 4-4 from FIG. 1.

FIG. 4A is an enlarged view of section 4A from FIG. 4.

DETAILED DESCRIPTION OF THE PREFERRED EMBODIMENT

Figure 1:
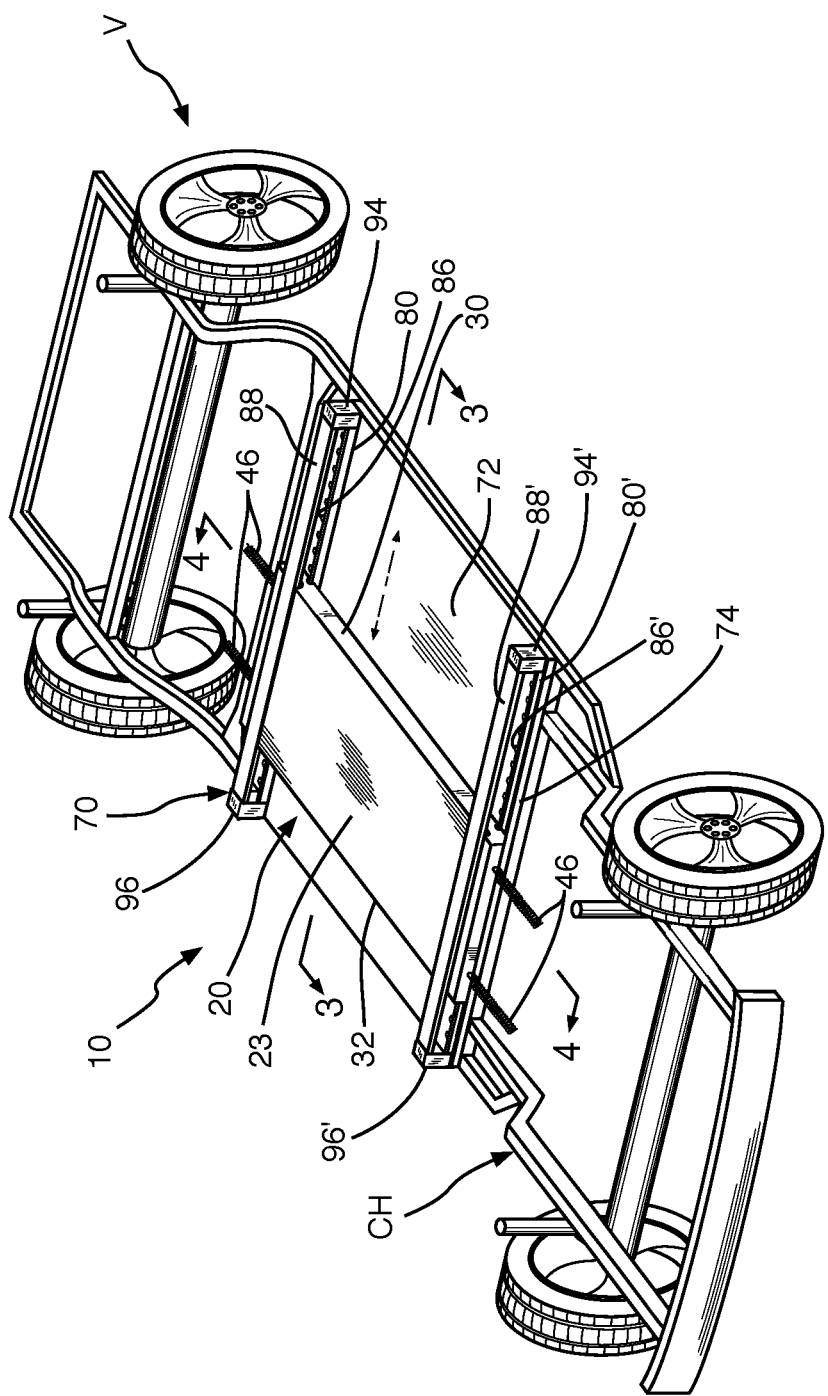
FIG. 1 is an isometric view of the present invention showing a battery assembly on a right side of a vehicle.

Referring now to the drawings, the present invention is a stabilizing electric battery system for vehicles, and is generally referred to with numeral 10. It can be observed that it basically includes battery assembly 20 and rail assembly 70.

Figure 2:
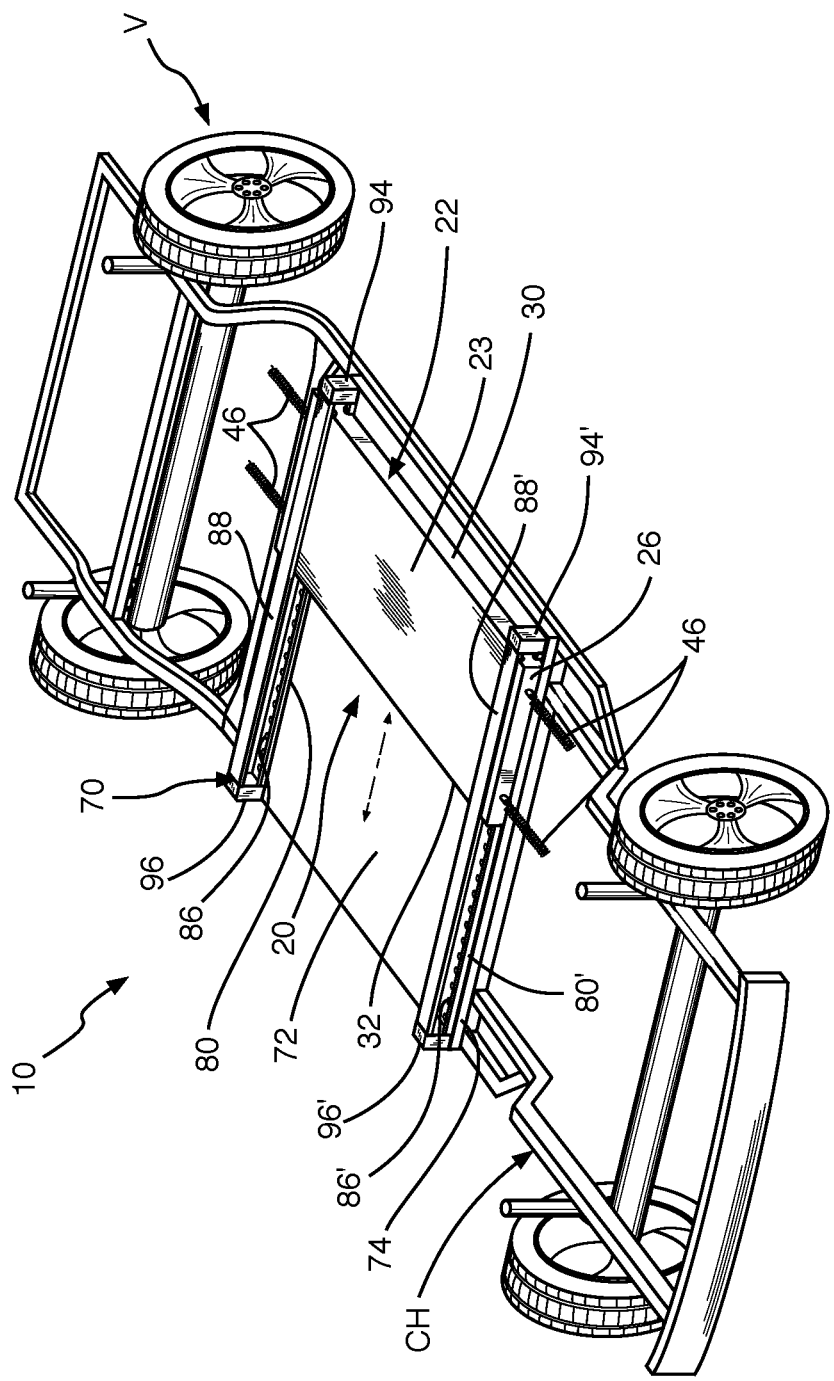
FIG. 2 is an isometric view of the present invention showing the battery assembly on a left side of the vehicle.

As seen in FIGS. 1 and 2, battery assembly 20 is mounted onto rail assembly 70. Rail assembly 70 is fixedly mounted onto a section of chassis CH of vehicle V. In a preferred embodiment, the section of chassis CH is a mid-section or central section of chassis CH for stability of vehicle V.

Rail assembly 70 comprises stoppers 94, 96, 94', and 96'. Stoppers 94 and 96 are respectively positioned at ends of rail 80 having rail top 88. Stoppers 94' and 96' are respectively positioned at ends of rail 80' having rail top 88'.

Battery assembly 20 defines a first predetermined area and the central section of chassis CH defines a second predetermined area, whereby the first predetermined area is approximately half of the second predetermined area. Thus, allowing battery assembly 20 to laterally move while mounted onto the central section of chassis CH. Battery assembly 20 therefore acts as a counterweight for improved stability of vehicle V.

When vehicle V turns, battery assembly 20 moves from right to left until respective first housing lateral wall 30 contacts stoppers 94 and 94', and from left to right until second housing lateral wall 32 contacts stoppers 96 and 96'. It is noted that battery assembly 20 move in a same direction of the turn. In a preferred embodiment, vehicle V is an electric vehicle.

Present invention 10 therefore improves the stability of vehicle V when taking a curve at any speed. In a preferred embodiment, battery assembly 20 is approximately 8 inches high, 70 inches long, and 23 inches wide, making battery assembly 20 narrower and higher than common electric vehicle batteries. In another embodiment, battery assembly 20 is connected to a steering wheel of vehicle V to detect movements to the left or to the right when turning.

As seen in FIG. 3, battery assembly 20 comprises housing 22 and battery 42. Battery assembly 20 is mounted onto rail 80 and 80', as seen in FIG. 1. Battery assembly 20 comprises housing top wall 23, housing bottom wall 24, and first and second housing lateral walls 30 and 32. Housing 22 is made of a resistant material able to support friction between housing bottom wall 24 and linear ball bearing assembly 86 and 86', as seen in FIG. 4. In addition, housing 22 is sealed and isolated to avoid the entering of water and extreme temperatures that may affect the functionality of battery 42.

As seen in FIGS. 4 and 4A, housing top wall 23 comprises first top channels 34 and 36, and second top channels 34' and 36'. Housing bottom wall 24 comprises first bottom channels 38 and 40, and second bottom channels 38' and 40'.

Battery 42 comprises connectors 44, wires 46, and battery ends 48. Connectors 44 and wires 46 extend from respective housing front wall 26, and housing rear wall 28. Battery 42 is enclosed in a sealed plastic housing, container, package, or the like to avoid moisture and water.

Rail assembly 70 comprises base 72, and first and second rails 80 and 80' respectively. First and second rails 80 and 80' respectively are mounted into base 72. Base 72 comprises base front end 74 and base rear end 76.

In a preferred embodiment, first rail 80 is mounted relatively close, and is aligned, with respective base rear end 76, and second rail 80' is mounted relatively close, and is aligned, with respective base front end 74. Rail 80 comprises rail bottom walls 82 and 84, and rail 80' comprises rail bottom walls 82' and 84'. Rails 80 and 80' further comprise linear ball bearing assemblies 86 and 86' respectively.

Rail assembly 70 further comprises first and second rail tops 88 and 88' respectively. First rail top 88 comprises rail top walls 90 and 92, and second rail top 88' comprises rail top walls 90' and 92'.

Battery assembly 20 is mounted onto linear ball bearing assemblies 86 and 86', whereby bottom channels 38 and 40 receive rail bottom walls 82 and 84 respectively, and bottom channels 38' and 40' receive rail bottom walls 82' and 84' respectively.

In addition, top channels 34 and 36 receive rail top walls 90 and 92 respectively, and top channels 34' and 36' receive rail top walls 90' and 92' respectively.

Battery assembly 20 moves on respective linear ball bearing assemblies 86 and 86' from right to left, and from left to right in the same direction of the turning of vehicle V, seen in FIG. 1, to counter centrifugal forces and increase/better stability when taking a curve.

Battery assembly 20 therefore functions as a counterweight to reduce a natural tendency of vehicle V, seen in FIG. 1, to continue in a straight line when taking a curve, making it easier to turn and take the curve with more stability. Present invention 10 also reduces centrifugal forces and enhances stability due to an oscillating weight of battery assembly 20. In one embodiment, present invention 10 nullifies 25% of this effect. When disconnected, battery assembly 20 is positioned in the center of vehicle V, as seen in FIG. 1.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

The invention claimed is:

1. A stabilizing electric battery system for vehicles, comprising:
   A) a battery assembly comprising a battery and a housing having a housing top wall, a housing bottom wall, a housing front wall, a housing rear wall, and first and second housing lateral walls, said housing top wall comprises first and second top channels; and
   B) a rail assembly fixedly mounted onto a section of a chassis of a vehicle, said rail assembly further comprising a base and first and second rails mounted onto said base, said first and second rails comprise respective first and second rail tops, said first and second rail tops comprises respective first and second rail top walls, each of said first and second rails further comprises a respective linear ball bearing assembly, said rail assembly further comprising stoppers, said stoppers being positioned at ends of respective said first and second rails, said battery assembly is mounted onto said rail assembly and moves laterally when said vehicle turns to increase stability of said vehicle in said turns.

2. The stabilizing electric battery system for vehicles set forth in claim 1, wherein said housing bottom wall comprises first and second bottom channels.

3. The stabilizing electric battery system for vehicles set forth in claim 2, wherein each of said first and second rails comprise respective first and second rail bottom walls.

4. The stabilizing electric battery system for vehicles set forth in claim 3, wherein said first and second bottom channels receive respective said first and second rail bottom walls.

5. The stabilizing electric battery system for vehicles set forth in claim 2, wherein while said vehicle turns, said battery assembly slides on said respective linear ball bearing assemblies from right to left and from left to right, in a same direction as said vehicle, while said stoppers limit movement of said battery assembly at said first or second housing lateral walls.

6. The stabilizing electric battery system for vehicles set forth in claim 1, wherein said battery comprises battery ends, connectors, and wires.

7. The stabilizing electric battery system for vehicles set forth in claim 6, wherein said connectors and said wires extend from respective said housing front wall and said housing rear wall.

8. The stabilizing electric battery system for vehicles set forth in claim 1, wherein said base comprises a base front end and a base rear end.

9. The stabilizing electric battery system for vehicles set forth in claim 1, wherein respective said first and second top channels receive respective said first and second rail top walls.

10. The stabilizing electric battery system for vehicles set forth in claim 1, wherein said vehicle is an electric vehicle.

11. The stabilizing electric battery system for vehicles set forth in claim 1, wherein said battery assembly defines a first predetermined area and a central section of said chassis defines a second predetermined area, whereby said first predetermined area is approximately half of said second predetermined area.

* * * * *